United States Patent [19]

Bessiere

[11] 3,937,663
[45] Feb. 10, 1976

[54] STRUCTURE OF FILTER MEMBERS
[75] Inventor: Pierre Etienne Bessiere, Golf Saint-nom-la-Breteche, France
[73] Assignee: Precision Mecanique Labinal, Saint-Ouen, France
[22] Filed: June 5, 1974
[21] Appl. No.: 476,458

[30] Foreign Application Priority Data
Apr. 16, 1974 France .............................. 74.13138

[52] U.S. Cl. ................. 210/493 R; 55/498; 55/521; 210/497 R
[51] Int. Cl.² ......................................... B01D 27/06
[58] Field of Search ............ 55/498, 500, 521, 497, 55/499; 210/457, 493, 494, 497

[56] References Cited
UNITED STATES PATENTS

| | | | |
|---|---|---|---|
| 2,627,350 | 2/1953 | Wicks | 210/493 X |
| 2,731,108 | 1/1956 | Kennedy | 210/493 X |
| 2,919,765 | 1/1960 | Kasten | 55/498 X |
| 3,013,939 | 12/1961 | Casalone-Rinaldi | 210/493 X |
| 3,022,861 | 2/1962 | Harms | 210/493 X |
| 3,087,623 | 4/1963 | Gewiss | 210/493 |
| 3,290,870 | 12/1966 | Jensen | 55/498 X |
| 3,490,211 | 1/1970 | Cartier | 55/497 X |
| 3,712,033 | 1/1973 | Gronholz | 55/521 X |

FOREIGN PATENTS OR APPLICATIONS

| | | | |
|---|---|---|---|
| 795,282 | 3/1936 | France | 55/521 |
| 1,179,607 | 5/1959 | France | 210/493 |

*Primary Examiner*—Charles N. Hart
*Assistant Examiner*—Robert H. Spitzer

[57] ABSTRACT

A filter structure comprising a support and a porous folded sheet having a plurality of cooperating groups of corrugations, wherein the folds of one group overlap at least in part the folds of the adjacent group and have a uniform thickness, length and substantially parallel fold apex lines. On opposed sides, the folded sheet has at least two borders each of which borders has a single group of folds terminating in a frontal edge located in a plane substantially perpendicular to the apex lines of the folds. The borders extend outwardly of the cooperating groups of the corrugations to form an area for contact with the support wherein the borders may be embedded by seal means.

29 Claims, 31 Drawing Figures

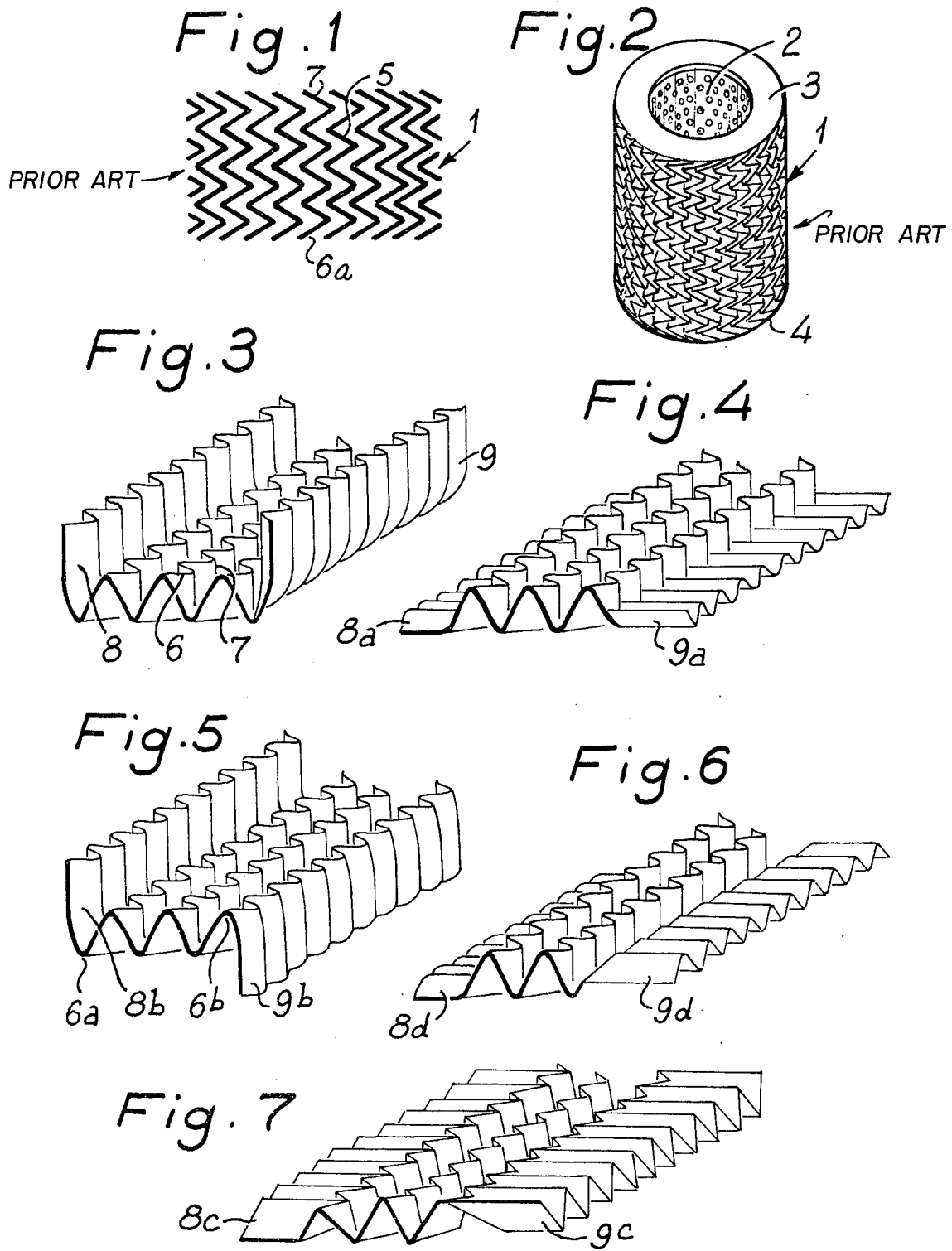

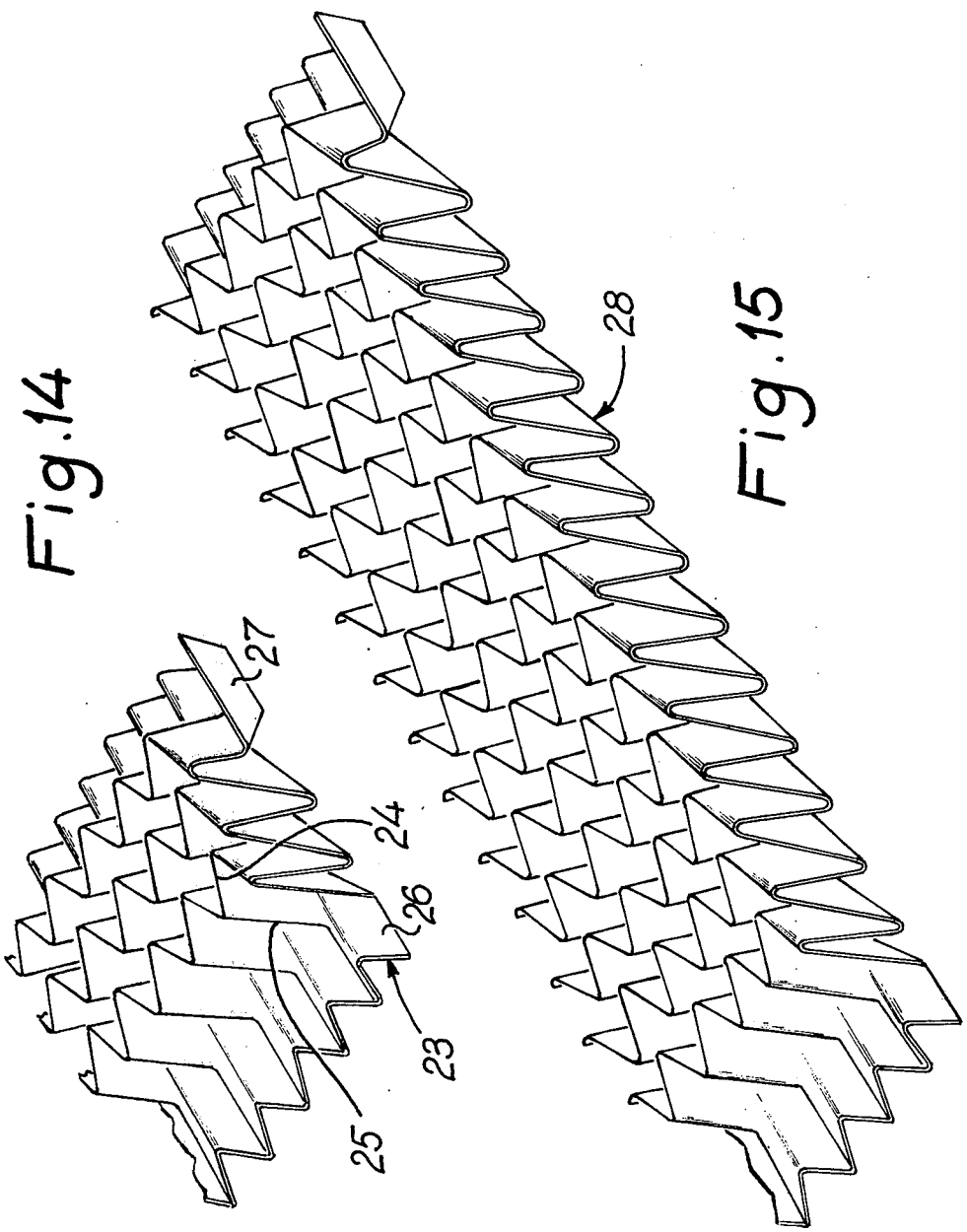

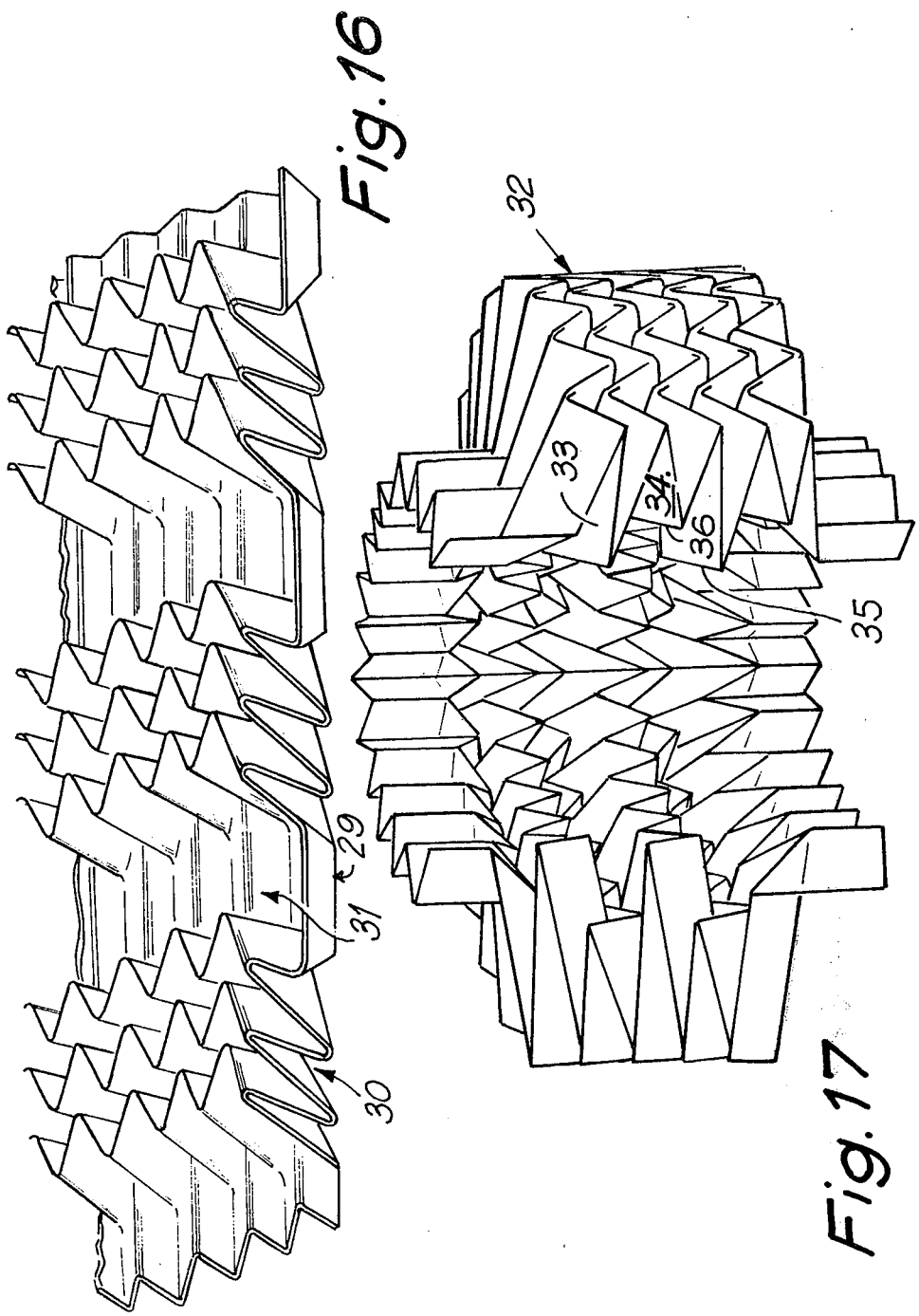

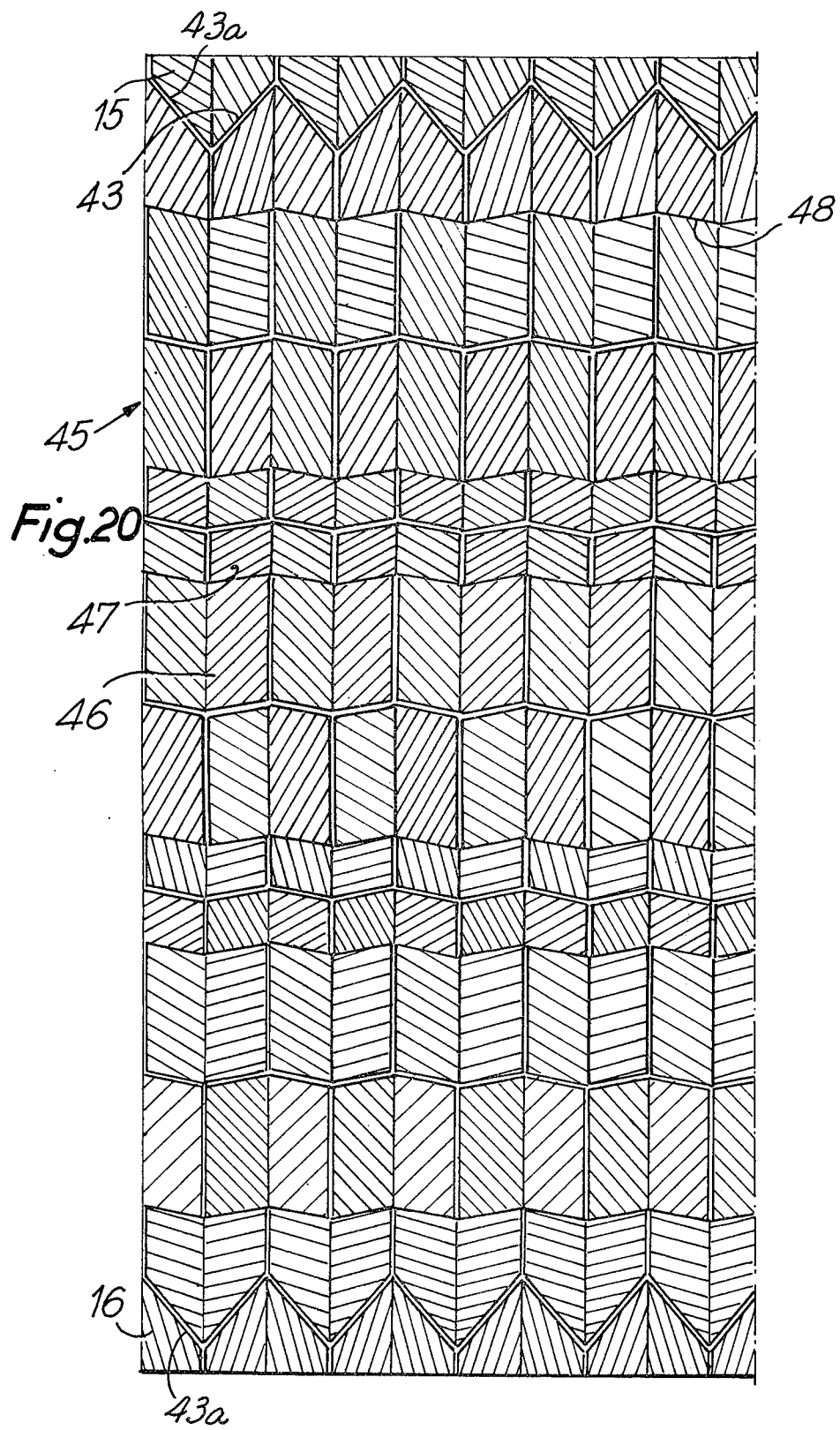

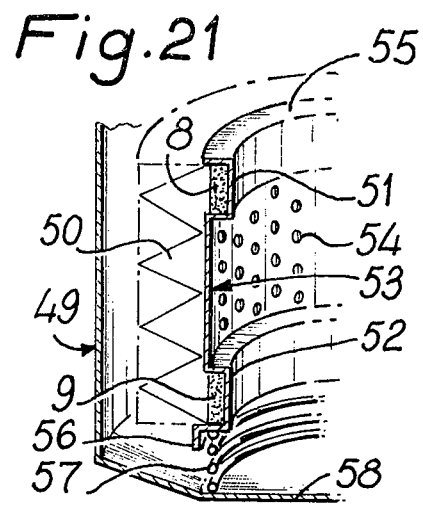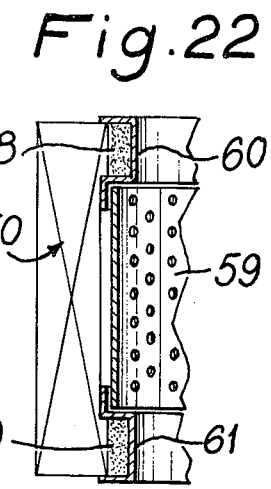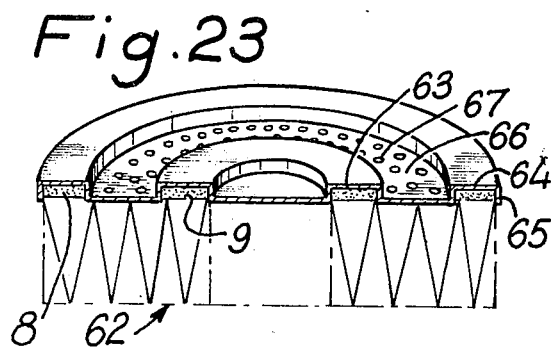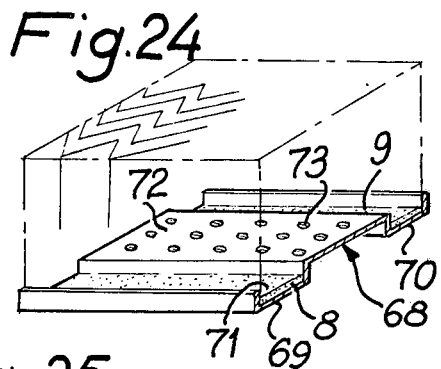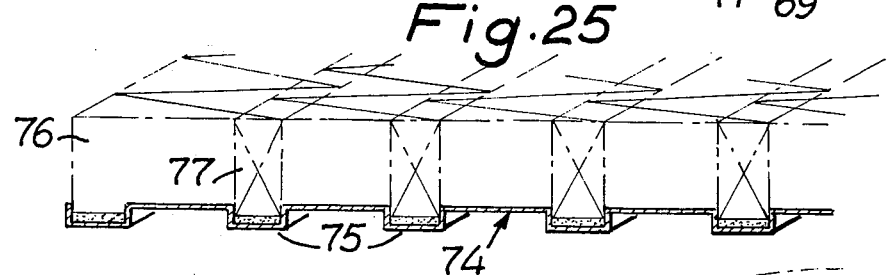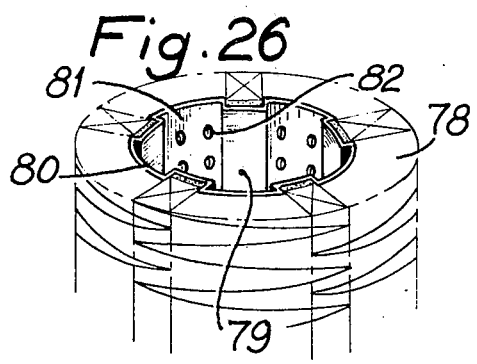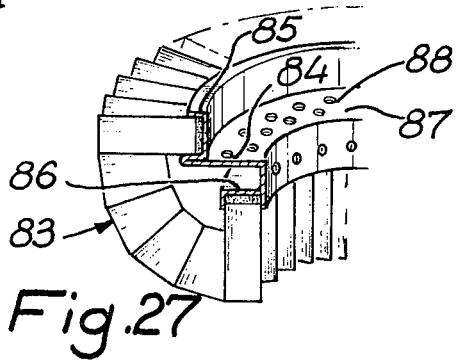

STRUCTURE OF FILTER MEMBERS

The technical field of the invention is that of filtration.

At present filters, and more particularly disposable filters are extensively used especially in the field of fuel supply and of lubricating internal combustion engines. It is therefore necessary to manufacture large numbers of such filters having most frequently the form of cartridges which are often thrown away after use.

In general, folded structures are used to form the filtering wall. In order to increase the effective surface the configuration of such structures comprises several groups of folds. Most frequently filtering surfaces are used in which a herring-bone pattern is superimposed on the structure corrugations or folds whereby chevrons with broken or undulated pleats are formed in the tops of the folds. The direction of the folds and the chevrons can be rectangular. Structures are also used wherein the fold lines form irregular systems traversing the structure given to the filtering wall in the thickness thereof in order to create reliefs assimilable to pyramids which can for example more or less overlap. Hereinafter these configurations will be designated "groups of folds".

It is obviously necessary to associate with such structures more or less rigid walls which can be perforated, and/or unbroken to provide a satisfactory support and, good mechanical characteristics of a filter member together with separation of its surfaces forcing the fluid to pass through the filtering wall and ensuring at the same time sealing between the spaces corresponding to each of the surfaces, especially in cartridge form of filters.

It is often necessary to provide at least one perforated wall permitting a connection between a first space and a first surface of the filtering structure, as well as end surfaces in order to provide the mechanical characteristics and the sealing.

Thus, in the case of a cylindrical filter member the filtering structure is most frequently provided internally with a perforated tube, at the ends of which are fixed annular plates or at least one annular plate at one end opposite to a full plate which seals the corresponding end of the perforated tube, whilst the annular plate forms a connecting opening.

Therefore a filtering wall whose structure is folded as described hereinbefore is pressed to closely abut the above-mentioned tube which thus forms a spacer and is sealingly connected in its planar end portions to two plates mentioned hereinbefore.

Chevrons are formed wherein the general direction of the folds is that of the rectilinear generating lines of a cylinder formed from the folded sheet and the direction of the chevron pattern is perpendicular thereto.

To obtain a sealed connection on plates by means of a binding agent both for the mechanical characteristics and for the achievement of the requisite sealing the binding agent must have a certain thickness so that the adhesive substance used coats over relatively large areas of the ends of the structure. These areas vary according to the degree of coating of the chevrons. This causes a decrease in the area available for filtration in the folded wall. This decrease can be substantial, particularly when the filters have only small dimensions. Thus, in the case of small cylindrical filter members with folds lying in the directions of the generating straight lines and having heads of the fold for example with three chevrons, the assembly of the plates of the filter member in the seal means covering approximately the entire area of the chevrons. Consequently about a third of the filtration surface is functionally lost because its holes are blocked by the binding agent.

In addition the seal means layer must have a width value which exceeds the thickness of the structure.

This is disadvantageous because each type of filter member requires a corresponding plate type and plates matching to the various thicknesses of the folded filter members. This is in fact disadvantageous both from the manufacturing standpoint and from that of possible immobilization and also of storage.

BRIEF SUMMARY OF THE INVENTION

The invention relates to a filter structure comprising a support and a folded sheet made of a porous material. The folded sheet has a plurality of cooperating groups of corrugations in which the folds of one group overlap at least in part the folds of the adjacent group and have a uniform thickness, length and substantially parallel fold apex lines. On opposed sides, the folded sheet has at least two borders each of which borders has a single group of folds terminating in a frontal edge located in a plane substantially perpendicular to the apex lines of the folds. The borders extend outwardly of the cooperating groups of corrugations to form areas for contact with the support wherein the borders may be embedded by seal means.

The invention brings about an improvement to filter structures by forming a folded sheet including groups of multiple sequential folds and chevrons and providing a large filtering area. The border position, dimensions, orientation and arrangement are predetermined relative to the average thickness of the structure. Each border-fold is formed with a flank whose end-portion is substantially located in a plane perpendicular to the apex line of the folds, a portion of the border extending a fraction of length beyond the apex line of the folds forms the area available for embedding in the seal means layer.

Numerous variants are possible. So, the borders can be provided in the form of extensions projecting outside the fold zones of the folded sheet, as for example extensions of the folds themselves. The borders also may extend to another direction, particularly as extensions of the portions having the chevron pattern.

As concerns the average thickness area of the structure the attachments on the borders can be located either on one side or on one and the other of the sides thereof, i.e. they may be staggered to a greater or lesser extent. In addition, these borders can be aligned one with respect to the other.

However, it is also possible to orientate them at particular angles and notably at right angles opposite to the average thickness area of the structure in the same direction or in opposite directions.

In view of the possible variations of positioning, orientation, arrangement and length of said borders a great flexibility is obtained as regards the association of said structure with complementary maintaining and sealing members.

Thus, in particular in the case of annular filter members of different sizes, it is possible to provide smaller plate sizes because such a border can be adjusted to any diameter differing from that given for the shape of the structure, thus resulting in a reduced consumption of adhesive or seal means glue.

Moreover, it is possible in this way to supply filter structures for all types of filter configurations such as those of simple or complex cylindrical shapes as mentioned hereinbefore, or in the form of rings or disks or those in the form of at least a fraction of a torous with random orientation of the folds, with or without overlapping of the chevrons or with evolute folds taking account of the internal and external filling of the structure in question.

The structure is applicable to groups of folds of random shape but preference is given to structures obtained in a developable manner, i.e. made of planar sheets of filter material.

Among the advantages obtained from the configurations in question, particular emphasis must be placed on the increased filtering area obtained which, as mentioned hereinbefore can be considerable reaching about 65% for example in the case of small filters and becomes greater as the filter becomes smaller as compared with that obtained through the prior art.

Other and further objects of the present invention will be apparent from the following description and claims, and are illustrated in the accompanying drawings which by way of illustration show preferred embodiments of the present invention and the principles thereof, and indicte what is considered to be the best modes contemplated for applying these principles. Other embodiments of the invention embodying the same or equivalent principles may be used and structural changes may be made as desired by those skilled in the art without departing from the present invention and the scope of the appended claims.

BRIEF DESCRIPTION OF THE DRAWINGS

FIG. 1 shows schematically the arrangement of the fold head chevrons in a prior art cylindrical filter member;

FIG. 2 shows a prior art filter member with a perforated spacer tube and side plates;

FIG. 3 shows a first variant of a filter structure according to the present invention with parallel edges extending along one side;

FIG. 4 shows a second variant of the filter structure in perspective view;

FIGS. 5 to 7 show further variants filter structures;

FIG. 14 is a perspective view of the formation of a small size filter member identical with that of FIG. 4;

FIG. 15 shows a filter member with spaced zones provided with chevrons;

FIG. 16 shows a filter member with spaced chevron pattern areas;

FIG. 17 is an open perspective view of the formation of a filter member identical with those of FIGS. 10 – 13 but with evolute folds;

FIGS. 18 to 20 show examples of the outlines of folds and chevrons representing the borders for two different sizes and for evolute folds;

FIGS. 21 to 27 are perspective views showing different assembly configurations of the filter members on several supports for obtaining cylindrical, circular, flat, simple or complex members or complex and toroidal cylindrical members;

DETAILED DESCRIPTION

Figure 8:
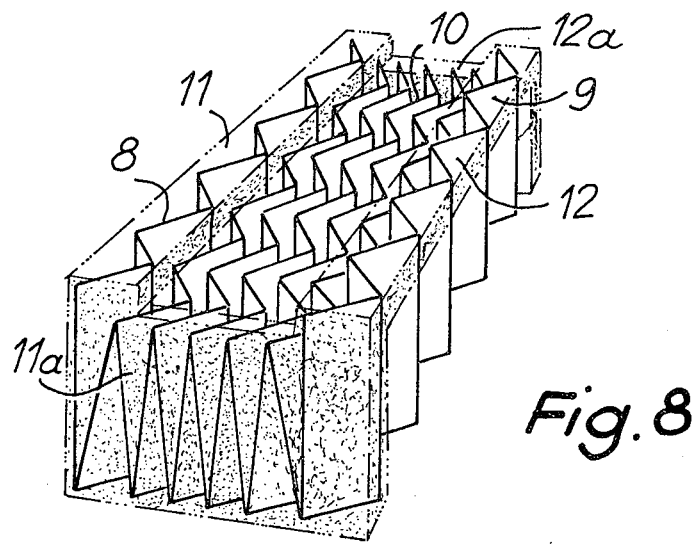
FIG. 8 is a diagram of a filter member produced according to FIG. 3.

As can be seen in FIGS. 1 and 2, prior art cylindrical filter members comprise a folded structure 1 provided with chevrons, from which a cylinder is formed by bending and joining the structure edge-to-edge on two end folds brought into contact and glued, then providing the structure 1 internally with a spacer 2 forming both a transverse and heightwise retaining member and a perforated wall, joining the tube integrally with two end plates 3 and 4, and sealingly connecting to said plates the corresponding portions of the structure 1, particularly by means of binding agent.

With a view to increasing the filtration area for a given size the chevrons formed by undulations of the folds the heads 5 thereof are made at an acute angle so that in a given height it is possible to provide the maximum numbr of chevrons, whereby the number of folds parallel to the cylinder axis is fixed.

Under these conditions the end portions 6a and 7 of the folded structure provided with chevrons are thickly coated end flanks of the chevron pattern and even if the connection with the end plates is achieved by a minimum thickness of adhesive compatible with the sealing requirements, the layer of adhesive will have a detrimental influence on at least one side of the chevron pattern and usually on a large area thereof. In general this adhesive layer surrounds at least one side of the chevron pattern this being equivalent to an effective area loss on both sides of the chevron pattern whose pin-holes are blocked.

In small filters where there are in general three chevrons per fold parallel to the cylinder axis this adhesive layer reduces the effective filtration area by about a third. Therefore it is necessary to increase the size of the filters so that also the weight thereof and the cost unnecessarily grow.

To obviate this disadvantage, the invention a folded sheet which has on at least two sides of its periphery special extensions or borders which are orientated in such a way that they penetrate into a seal means layer at a small angle relative to the perpendicular on the free surface of this layer. A result of this extension is that the effective surface area provided for the particular member is it preserved and that is possible to decrease the filter overall dimensions. Thereby the flexibility of use and shaping are improved as regards both the filter members themselves and their accessories.

In the variant of the present invention shown in FIG. 3, a folded sheet with fold apex line 6 is formed into repetitive chevrons 7 and is provided at the ends of the folds with extensions 8 and 9 forming borders which project on both sides from one of the faces of the thick structure and are raised at an angle of 90° from one and the same free side of the structure towards the other face thereof and extend beyond same.

Taking account of the chevron pattern of the apex lines of the fold 6, extensions 8 and 9 also are folded homologously to the above-indicated chevron pattern but the height of the homologous fold can differ greatly and can be more particularly less than the height of the main chevron pattern. Consequently the thickness of these extensions can be small relative to the thickness of the folded sheet itself and may be equal to the size of the fold.

As can be seen in FIG. 4 the extensions 8a and 9a instead of being raised at the angle of 90° relative to the average thickness plane of the described folded sheet can be made parallel to the plane thereof.

FIG. 5 shows a variant wherein the extensions 8b and 9b are positioned relative to the above-indicated in opposite directions. Moreover extension 8b is connected to the central structure by a low fold line 6a, whilst conversely extension 9b is attached along an opposite, i.e. high line 6b.

The variant of FIG. 7 is a configuration wherein the extensions 8c and 9c are parallel to the average plane of the folded and chevron structure.

The variant of FIG. 6 has one of its borders 8d attached to a low fold line, whilst its border 9d is attached in an intermediate area and is located at mid-height of the thickness of the intermedite folded and chevron structure.

Thus, numerous variants of the invention are possible, particularly the borders may have different inclinations, for example one may be perpendicular to the structure and the other may be simply an extension thereof.

FIG. 8 shows a folded structure provided with chevrons 10 in a plate-shaped filter member, as well as the corresponding sealing and attachment zones. The heads of borders 8 and 9 are joined by a binding agent forming a type of strip 11 or 12, whilst the end surfaces are immersed in a platelet 11a or 12a of binding agent. In this structure there are obtained the two necessary separate operating surfaces that i.e. those which appear between the strips 11 and 12; the strips and surfaces 11a and 12a are forming a sealed box assembly capable to receive and filter a liquid or liquids passing through the sheet.

Figure 9:
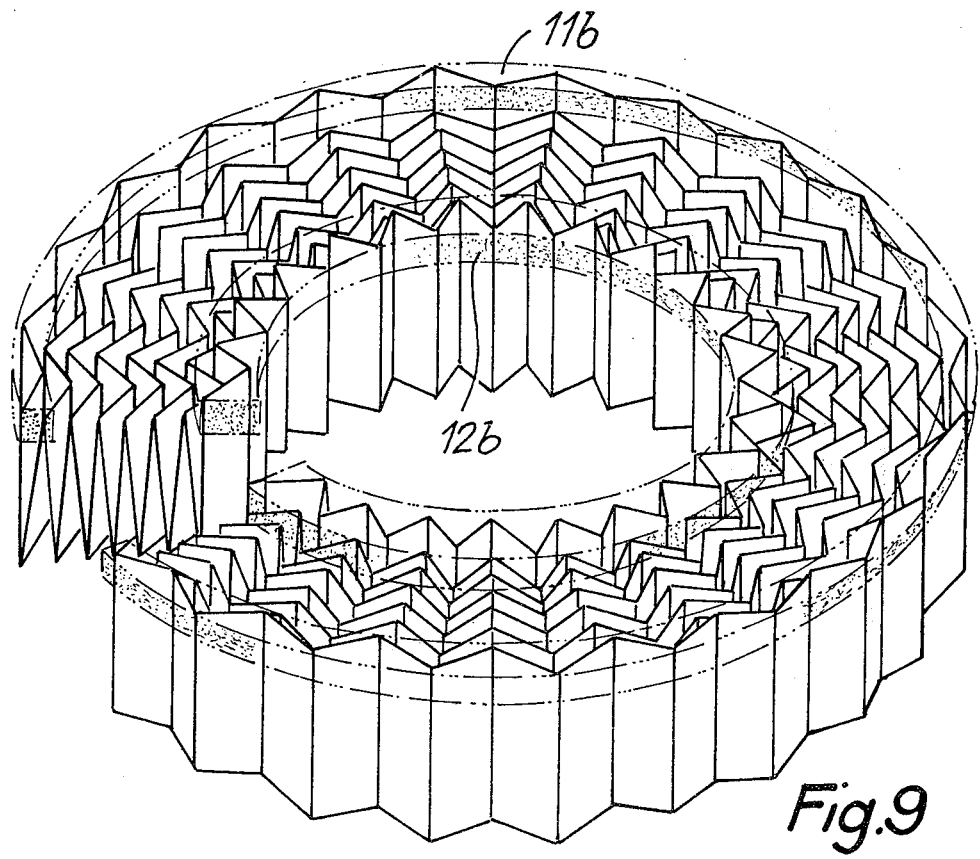
FIG. 9 is a further diagram of a filter member arranged in the form of a ring.

FIG. 9 shows a disk-shaped variant of the present invention wherein the strips form circular or crown-shaped lines 11b and 12b (the connection of the ends of the structure is not shown). Here a circular folded filter including a chevron configuration is obtained whose faces contain the fold lines. In connection with either a plate and/or crown-shaped member in this variant a complete effective filtration area provided with chevrons is obtained wherein the sealing and fixing glue layers only appears on the borders 8 and 9, on extensions not determining the filtration area.

It can be seen that these borders penetrate the surface of the glue layer approximately perpendicular thereto so that the fixing area is of limited width.

Figure 10:
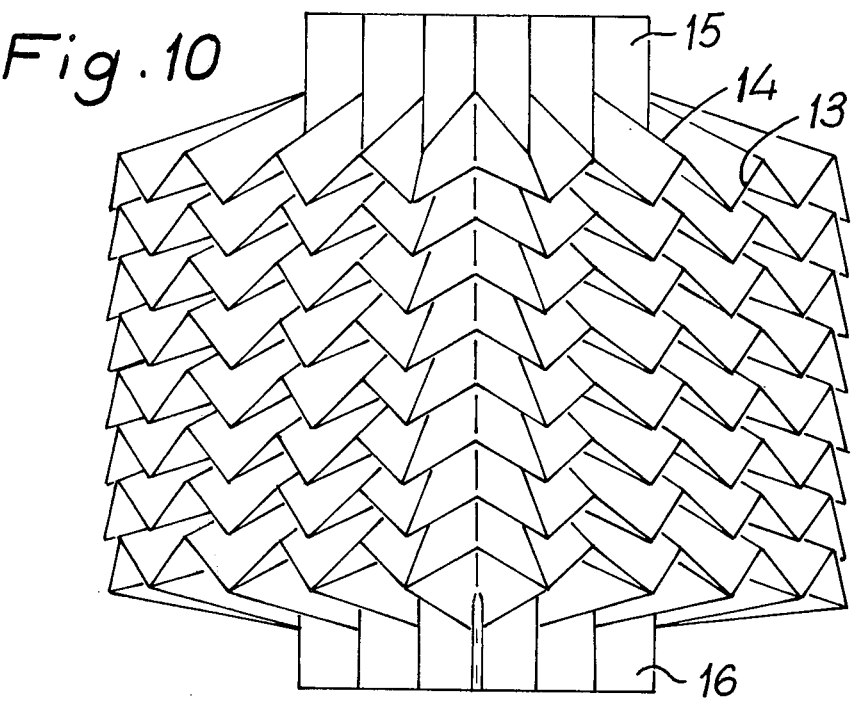
FIGS. 10 and 11 is an elevational view of two variants of a cylindrical filter member having respectively internal and external borders.

In the arrangement of FIG. 9, the fold lines are shown undulated or broken by the chevron effect and contained in planes perpendicular to the axis of geometrical revolution. In FIG. 10 the folded and chevronned structure is arranged so that the fold lines are contained in cylindrical surfaces, i.e. in the inner and outer envelope surfaces of the filter member. The chevron lines become virtually radial instead of being axial as in FIG. 9. Consequently the fold lines 13 appear on the cylinder exterior and the chevron lines 14 are distributed on substantially conical surfaces. In FIG. 10, the folding borders 15 and 16 are formed from the folds and chevrons of the filtering surface. Said surfaces 15 and 16 can have an external diameter which is less than that of the external enveloping cylinder of the filtering surface.

Figure 11:
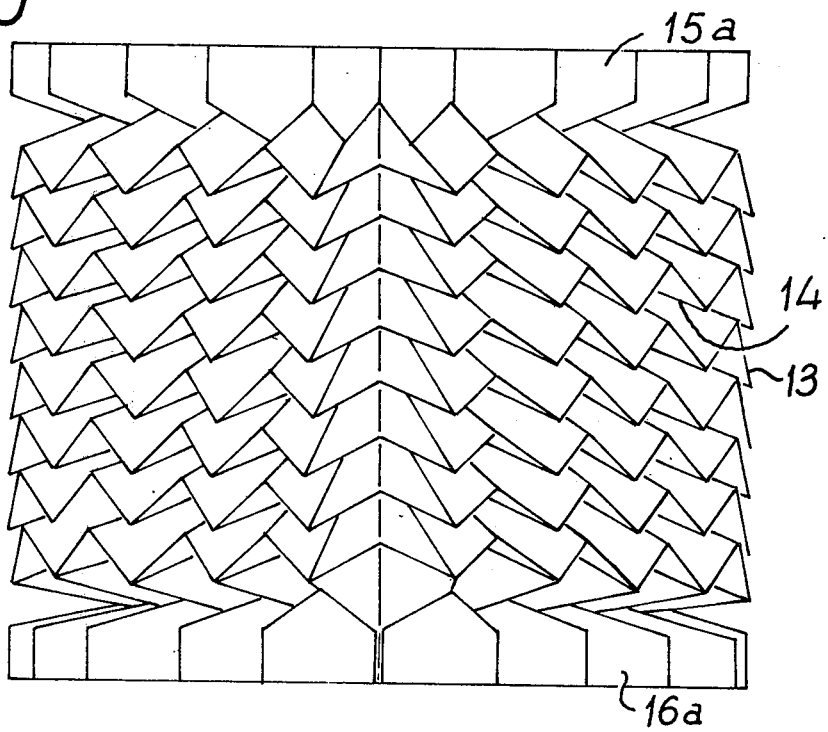

FIG. 11, shows a folding similar type to that of FIG. 10, but with a different configuration of the filtering surface there being provided borders 15a and 16a formed from folded surfaces, said borders having substantially the same external enveloping diameter as that of the external enveloping cylinder of the filtering surface having folds 13 and chevrons 14.

Figure 12:
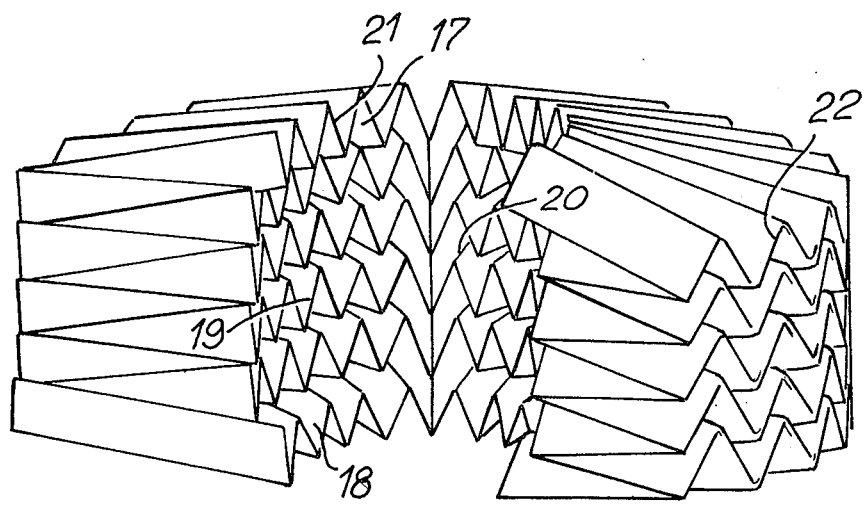
FIGS. 12 and 13 is a perspective view of a filter member in two other variants showing the arrangements of the borders with folds having chevrons which overlap on the outside and are disengaged on the inside.

FIG. 12 shows an embodiment wherein the borders 17 and 18 project beyond the inner enveloping cylinder of the filtering surface. This internal cylinder is limited along the fold lines 19 which are broken, undulated or given a chevron effect as shown in, lines 20. Similarly the borders 17 and 18 are limited by lines 21 which exactly reproduce the chevron effect. Moreover, the outer folds 22 are closer to one another than the innr folds 19, thus the inner chevrons being separated from one another on two adjacent fold lines, whilst externally overlapping one another.

Figure 13:
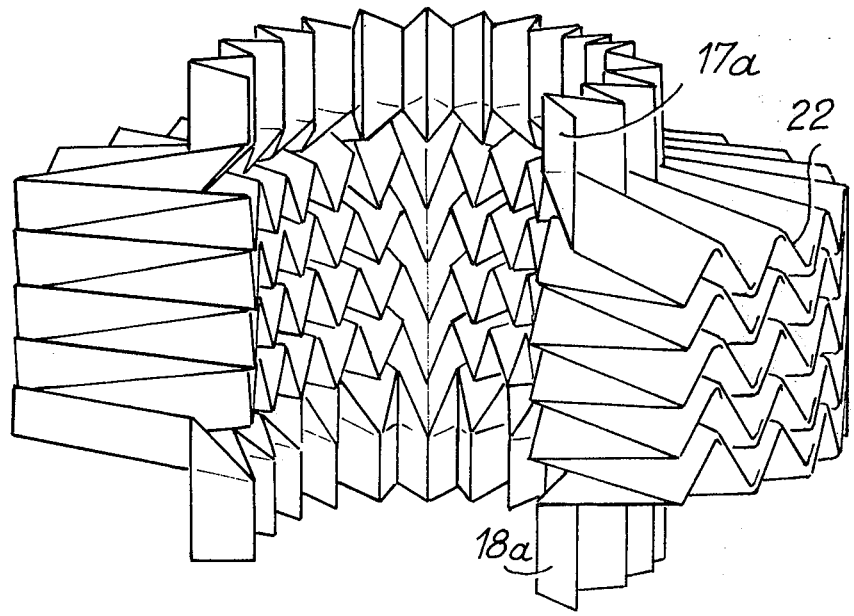

The same feature appears in the embodiment shown in FIG. 13, wherein however the borders 17a and 18a are positioned in axial direction similarly as in the embodiment of FIG. 10.

The borders according to the invention enable and filter members to be provided at their ends with glued, sealed or annular plates of planar form; otherwise it would be necessary to use conical or frustum-shaped plates.

In small filter members produced according to FIG. 13, the inner chevrons are sufficiently close to each other, so that the fold lines are supported upon one another. The axial orientation of the borders, together with mutually supporting folds to give the filter member a good resistance to axial compression.

FIG. 14 shows how the filtering sheets described hereinbefore can be made. It can be seen that a sheet material 23 can be provided with folds 24, namely with average rectilinear end lines undulated or broken over their complete length, thus apices of the a chevron system 25 being formed. Borders 26 and 27 are here projecting ends integral with the end folds of the sheet. Therefore these borders follow and the folding thereof the undulated lines of the chevron system. Thus, it is easy to obtain the configurations described hereinbefore as regards the position and orientation of the borders relative to the effective folded and chevron portion of the sheet. When the sheet is wound about an axis substantially parallel to the chevron direction and when the concavity in the winding is formed on the side opposite the projection of these borders, the configuration of FIG. 11 is obtained. When this concavity is formed on the side of the projection of the borders the configuration of FIGS. 10 and 13 is obtained. FIG. 14 shows a folded chevron sheet provided with borders and having a body with three free folds which is suitable for producing small filters. FIG. 15 shows a large number of folds, in the body 28 being suitable for producing either flat filters of great length or cylindrical filters of great height.

As shown in FIG. 16 a filter body 29 can also have zones 30 with fold and chevron areas separated by area 31 without folds, i.e a body being suitable for formation of filters with distributed chevrons and folds. By cutting the zones 31 for a plurality of bodies identical with that shown in FIG. 14 may be obtained.

FIG. 17 shows a variant of FIG. 13, wherein the external area of the filter body 32 has an evolute fold pattern and wherein alternating folds 33 of a considerable height are separated by folds 34 of a lesser height, this embodiment providing enlargement of the inner area of the filter member wherein the folds 35 have narrow chevrons. The inner ridge lines 36 corresponding to the short folds are remote therefrom and are therefore closer to the outside, thus the narrowness of the chevrons being smaller when clogging is increasing, this arrangement nevertheless permits to obtain a superior effectiveness of the filter member 34.

Figure 18:
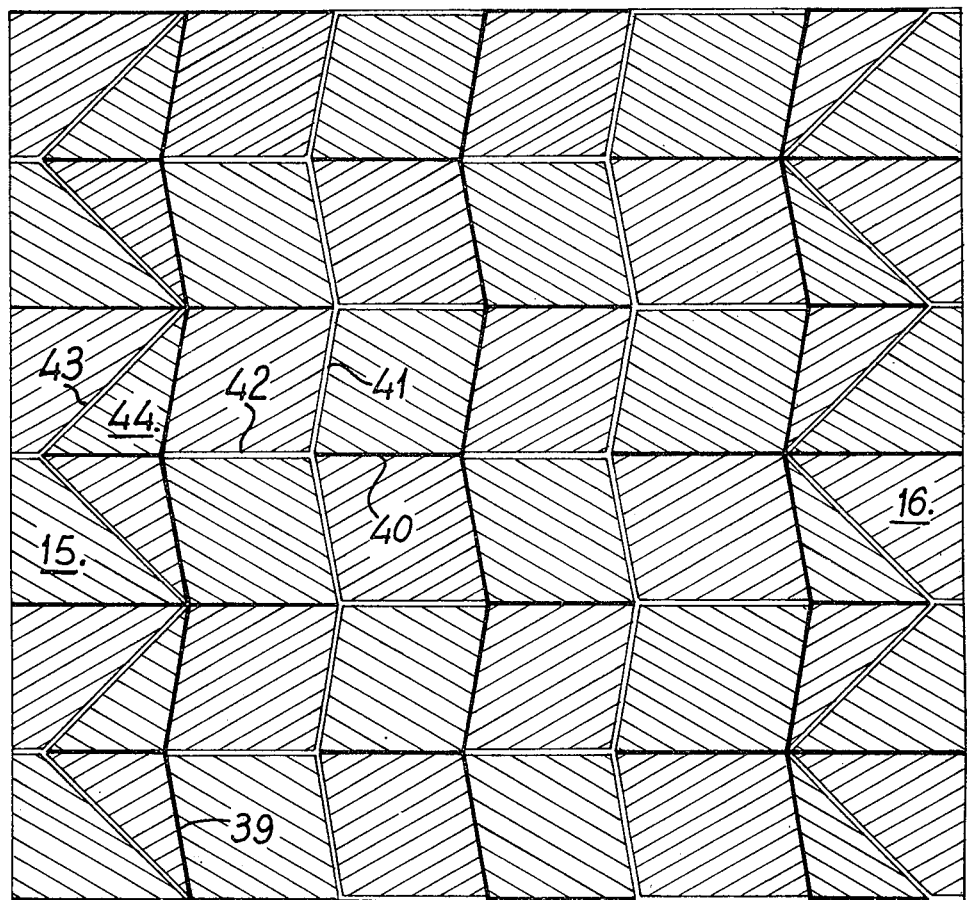
Figure 19:
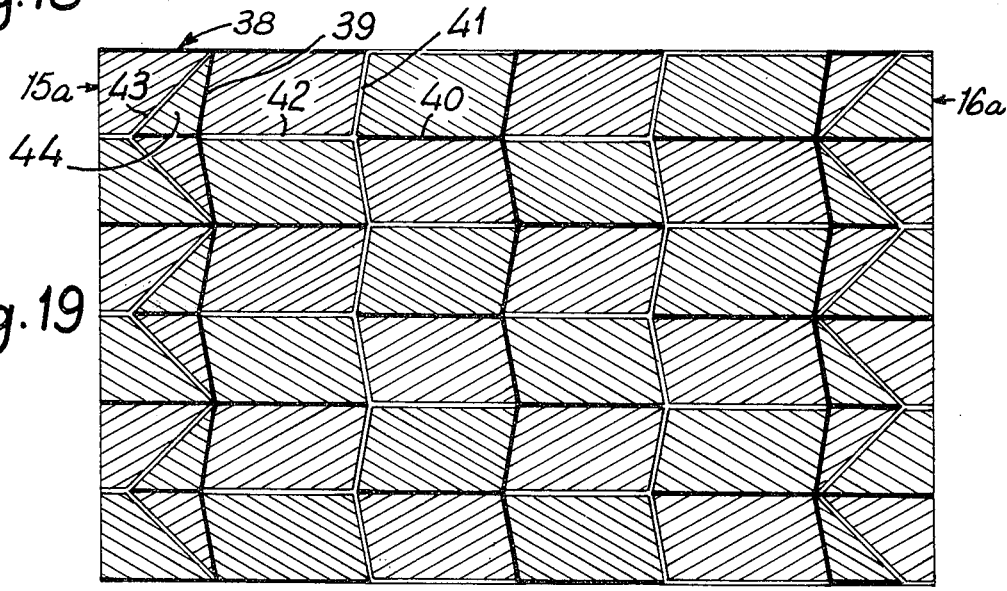

FIGS. 18 and 19 show examples of planar corrugated sheets 37 and 38 of two different sizes wherein there can be seen folds 39 on one side of the filter body as well as apices 40 of the chevron system corresponding to a first inclination. The latter are shown by continuous heavy lines. In addition, the fold lines 41 and the apices of the chevron system 42 which appear on the other side and have opposite inclinations are marked by parallel lines. It can be seen that borders such as 15, 16 or 15a, 16a are obtained as a result of providing a supplementary fold line 43 as an undulated or broken line associated with the end fold lines and forming supplementary outer points 44.

FIG. 20 shows a configuration for a sheet 45 similar to that of FIG. 19 wherein identical fold lines are provided which however determine folds belonging to two alternating series, namely folds of great height 46 and folds of lesser height 47 suitable for a filter body with evolute folds such as that shown in FIG. 17. To the difference from FIG. 17 the supplementary fold lines 43a defining borders 15 or 16 do not come into contact with a final fold line 48, but are spaced therefrom to define borders 15, 16 projecting from the filter body in an intermediate area of its thickness.

FIG. 21 shows a configuration of a cartridge 49 wherein a filter body 50 is provided by forming a chevron folded member provided with borders 8 and 9 in a configuration such as that shown in FIG. 3, which however underwent a cylindrical winding. It can be seen that borders 8 and 9 are assembled in sealed manner in cylindrical grooves 51, 51 and that a fitting 53 provided with holes 54 is inserted between the above-indicated grooves. This cylindrical fitting provides a sealed support edge 55 on an elastically coupled base of cartridge 49, and on the other side the edge of the groove 52 is turned down edge 56 to provide abutment for a compression spring 57 inserted between the fitting 53 and a sealed base 58 of the cartridge dome.

FIG. 22 shows a fitting comprising, a perforated cylinder 59 whose ends are fitted to annular members 60 and 61 providing sealing grooves needed for the borders 8 and 9 of filter member 50 which comprises substituting members 59 permitting to universally use a single type of member 60, 61 for various heights of the filter body.

The fitting 59 shown in FIG. 21 formed as a one-piece member having at its ends grooves 51, 52 as well as the cylinder 59 of FIG. 22 with separate groove members 60, 61 also can be shaped differently. So for instance in place of circular grooves it is possible to provide annular planar channels enabled to be joined to members having unfolded borders such as those shown in FIGS. 4, 6 and 7.

FIG. 23 shows an arrangement wherein a filter body 62 of the type shown in FIG. 3 is not given a cylindrical form, but is shaped instead as a disk by winding about an axis perpendicular to the plane defined by the ends of borders 8 and 9. These borders are connected to the base of annular groove 63 and 64 provided in a plate 65 as to two concentric formations separated from one another by an annular zone 66 provided with perforations 67.

As in the previously described embodiments sealing glue layer on borders 8 and 9 in grooves 63 and 64 effectively separates the two surfaces of the sheet filter material whereby one of the sheet surfaces contacts solely the perforated area 66 and the other surface freely faces the outside. Also here, a member is obtained which can be sealingly mounted in a cartridge which has an enveloping wall for said member.

FIG. 24 shows that sheet member of FIG. 3 disposed without bending on a plate 68 offering two grooved edges 69 and 70 wherein the sheet member may be fixed by immersing it into a glue layer or polymerizable plastic material 71 on the borders 8 and 9 of the filter sheet member, here the rectilinear grooves are shown as separated by a planar surface 72 provided with perforations 73.

FIG. 25 shows an arrangement with repetitive areas such as that shown in FIG. 24, wherein an inner plate 74 is provided having a plurality of e.g. equidistant grooves 75. This plate makes to assemble a plurality of filter bodies 76 of the type described by interlocking one or a pair of borders 77 in a single groove for connecting two adjacent filter bodies.

This modification could also be envisaged for the arrangement of FIGS. 21 and 22 wherein the interlocking on the border zones of the filter sheet members may be made in grooves 51 and 52 or 60 and 61. FIG. 26 shows interlocking of border zones of filter sheet members 78 effected in rectilinear grooves 79 provided in a cylindrical fitting 80 and following the direction of the rectilinear generating lines. Adjacent pairs of grooves 79 are separated by segments 81 having perforations 82. It can be seen that the filter sheet members 78 are curved in a direction perpendicular to that shown in FIGS. 21 or 23.

It can also be concluded that the filter member can be given a cylindrical configuration by disposing in a circle in the main plane of a fold shown in FIGS. 21 and 23 or in a circular formation perpendicular to said plane. Summarising the member of FIG. 3 is related to three rectangular axes of which one is the main line of the folds, the other one being perpendicular to the first named line in the plane of these main lines, and the third being perpendicular to the two first-mentioned lines; the axis of rotation of the configuration of FIGS. 21, 23 and 26 correspond respectively to the first the second of the mentioned axes.

FIG. 27 shows a filter sheet member 83 having a quarter torous shape wherein fitting 84 is provided having a square cross-section, a first cylindrical groove 85 and a second annular groove 86 similar to those shown respectively but separately in FIGS. 21 and 23. An annular member 87 provided with perforations 88 connects the grooves. This member may be integral with the grooved members or may be connected to and dismountable from them.

Figure 28:
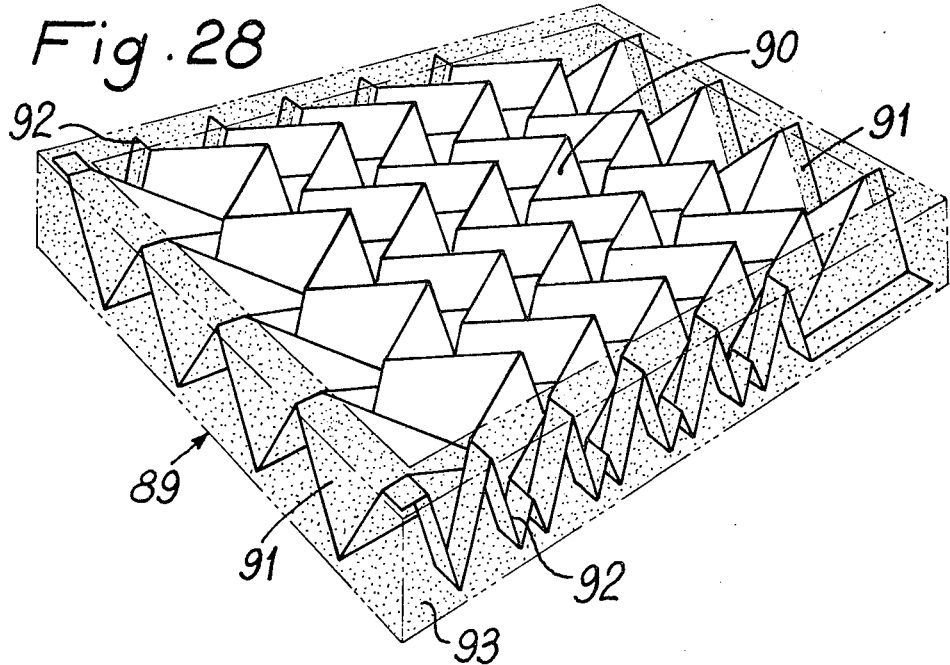
FIG. 28 is a perspective view of a filter structure having evolute folds forming a plate member where the structure is provided with borders on its complete periphery.

FIG. 28 shows a plate-shaped sheet member 89 whose undulating and chevron structure 90 has borders of two types namely the borders 91 such as described hereinbefore being simple extensions following the direction of the folds, and the other borders 92 being extensions following the direction of the chevrons. These two types of borders as in the previous cases, penetrate in a substantially perpendicular manner into a layer of adhesive 93 which borders the four sides of said member 90 as shown by the delimiting lines and shaded areas. Thus the members have two borders with extending folds or two borders with extending chevrons, at the same time.

Figure 29:
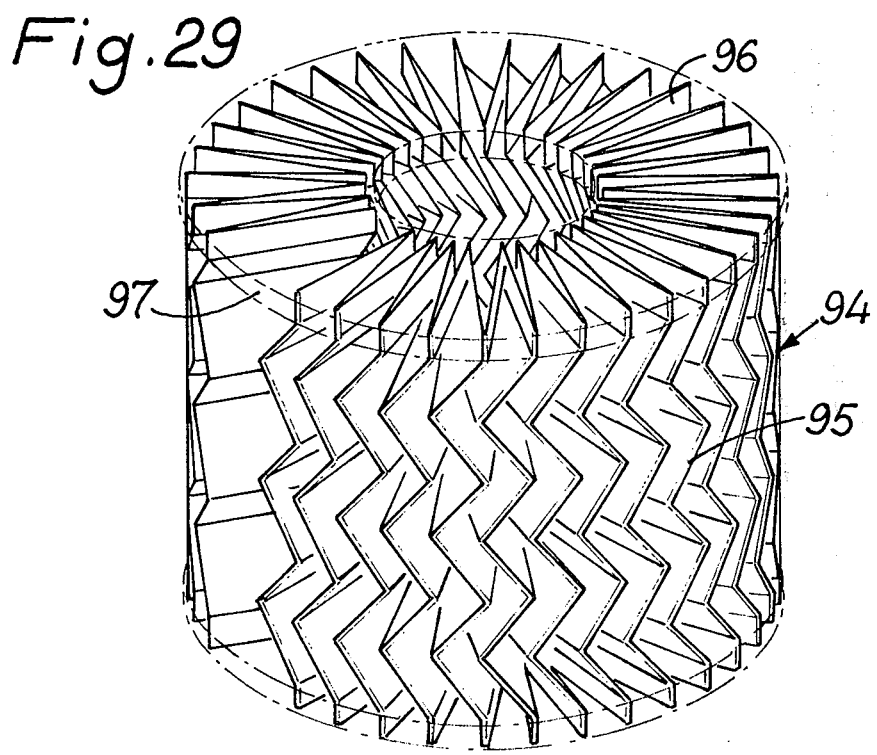
FIG. 29 also is a diagrammatical view of a cylindrical filter structure whose border is provided over the complete height of the folds, being radial.

FIG. 29 shows a cylindrical sheet filter member 94 whose fold lines 95 are no longer disposed along guiding circles as shown for example in FIGS. 10 – 13, but are on rectilinear generating lines of the enveloping cylinder. In this case, the borders 96 are in the form of extensions of the chevrons and are arranged perpendicularly to the plane of end plates 97 which receive the glue binding substance fixing and sealing the borders 96.

In connection with FIGS. 21 and 22 it has been stated that the cylindrical grooved members 53 or 59, 60 and 61 can be used for providing filter member of heights differing from those shown in FIG. 3. They can for example be used for filter members of the type shown in FIG. 13.

Figure 30:
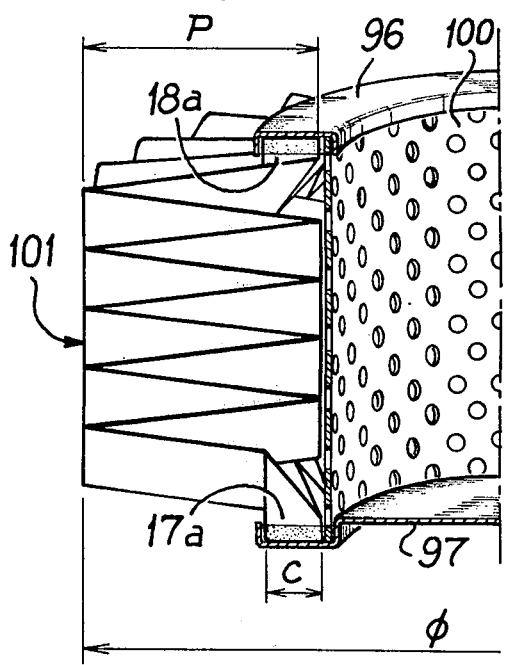
FIGS. 30 and 31 are partial perpective views of two comparative sizes of filter with the same side plates.
Figure 31:
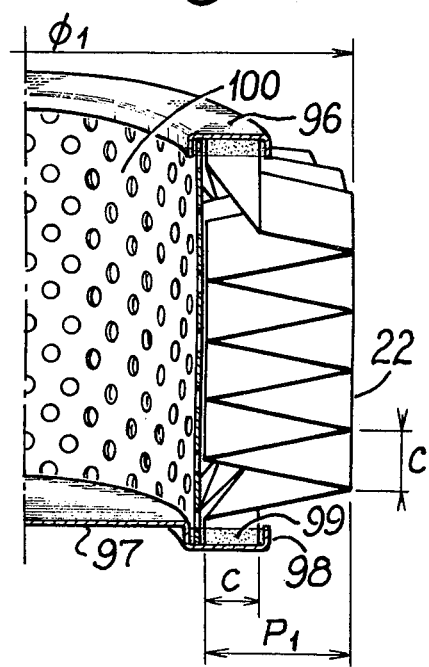

A high type of filter member is shown in FIGS. 30 and 31. Therein two borders 17a and 18a have a thickness given by the folds homologous with the chevrons 22, i.e. the folds have surfaces between successive apices being of the same width C as the sides of the chevrons. These borders are in fact tangential to the inner enveloping cylinder of the said filter member.

One end plate 96 is annular, and the other plate 97 has a full base dish 98 either integral therewith or sealingly connected thereto.

The plates 98 and 96 provide grooved circular flanges, one of which has a width slightly greater than the thickness of the filter sheet borders in order to receive the minimum volume of binding agent or glue 99.

The width of the fold designated by the reference P in FIG. 30 can vary from the value $P_1$ shown in FIG. 31 to correspond to the external diameters $\theta$ and $\theta_1$ for the selected filter members involved.

The height of the filter member can be further varied. It is possible to use a central perforated tube 100 either integral with or connected to the end plate in sealing manner by a binding agent.

In the embodiments of FIGS. 30 and 31, the folds and chevrons of the sheet member designated in general by the reference numeral 101 are given a trapezoidal cross-section, the large base length whereof is reduced to a greater or lesser extent by compression between the end plates. This construction makes it easier to disengage the dimensions of the chevrons in the inner area, whereby for example the outer area remains more "aerated" no matter whether the folds are overlapping or evolute and overlapping due to the extension of the corresponding circumference of the corresponding outer enveloping geometrical cylinder.

The same considerations apply to the case of a filter member having inner borders with evolute folds as shown in FIG. 17 as well as in FIGS. 10 and 11, whilst in the case of FIG. 11 the borders extend externally as also do the sheet members the borders of which extend intermediately in respect to the thickness of the sheet structure or are in alternating positions, i.e. one is external and the other is internal.

The thickness of the borders is indicated hereinbefore as substantially equal to the dimension C of the width of the chevron flank. Same can be reduced by sub-dividing the fold of such a border, thus receiving still further the width and the quantity of binding agent together with the volume of the receiving grooves in the end plates.

It is specifically pointed out that all the features of the assemblies described hereinbefore are closely interlinked and that the filter member is provided with borders.

Finally, it is worthwhile to mention that in all the gurations of the present invention the presence of the borders hereinbefore defined and described permits the fixing of filter members to their assembly members without any loss on the structure of effective area provided for the passage of the liquid to be filtered through the latter, no matter what configuration is given to one or more groups of the folds.

While there has been described and illustrated preferred embodiments of the invention, it is to be understood that these are capable of variation and modification and therefore the invention is not limited to the precise details set forth but covers all such modifications and alterations which fall within and do not depart from the scope of the invention and of the following claims.

I claim:

1. A filter structure comprising a support and a porous folded sheet having a plurality of cooperating groups of corrugations, the folds of one group overlapping at least in part the folds of the adjacent group and having uniform thickness, length and substantially parallel fold apex lines, said folded sheet having at least two borders each having a single group of folds terminating in a frontal edge located in a plane substantially perpendicular to the apex lines of the folds, the folds of each of said borders extending outwardly of said cooperating groups of corrugations to form an extended area for contact with said support and seal means for embedding said border areas fixedly to said support.

2. The structure in accordance with claim 1, in which each border has a single group of folds selected from the group consisting of zig-zag, pointed apex and rounded apex formations.

3. The structure in accordance with claim 1, in which the borders extend in the same plane.

4. The structure in accordance with claim 1, in which the borders extend in different planes.

5. The structure in accordance with claim 1, in which said folds define an inner and outer surface providing a predetermined thickness of said folded sheet and wherein the borders extend in a plane passing through one of said surfaces.

6. The structure in accordance with claim 1, in which said borders have relative to said structure the same orientation.

7. The structure in accordance with claim 1, in which the borders have relative to said folded sheet different orientations of extension.

8. The structure in accordance with claim 1, in which the number of borders is greater than two and can reach a number equal to that of the sides of the said structure.

9. The structure in accordance with claim 1, in which the plurality of said overlapping groups of corrugations comprise both linear folds and chevron folds.

10. The structure in accordance with claim 9, in which at least some of the groups of corrugations are formed with marginal folds and the borders are disposed along the marginal folds.

11. The structure in accordance with claim 9, in which at least some of said groups of corrugations are formed with chevron margins and the borders are disposed along the marginal chevrons.

12. The structure in accordance with claim 9, in which the borders are located both along the marginal chevrons and folds.

13. The structure in accordance with claim 9 in which said folded sheet is shaped to form a cylinder said two borders being located respectively at each end of said cylinder.

14. The structure in accordance with claim 13, in which the cylinder axis is parallel to the direction of the fold apex lines.

15. The structure in accordance with claim 14, in which the cylinder axis is parallel to the direction of the chevrons.

16. The structure in accordance with claim 13, in which the cylinder axis is perpendicular to the direction of the fold apex lines.

17. The structure in accordance with claim 1, wherein said folded sheet is shaped in irregular manner.

18. The structure in accordance with claim 17, wherein said folded sheet has the configuration of at least a partial torous.

19. The structure in accordance with claim 1, wherein said support comprises a fitting having at least one perforated section and at least one pair of grooves for receiving the borders and said seal means.

20. The structure in accordance with claim 19, in which the fitting is detachable.

21. The structure in accordance with claim 19, in which the fitting comprises circular grooves whose diameters are smaller than the diameters of the borders of the filter members.

22. The structure in accordance with claim 19, in which rectilinear grooves are provided on a fitting which forms a substantially planar plate.

23. An assembly of a pair of the structures formed in accordance with claim 19, wherein the borders of one of said structures overlap the borders of the other structure in the same groove.

24. The structure in accordance with claim 19, where said folded sheet is shaped into a generally tubular form and has the borders fixed in grooves filled with a sealant.

25. The structure in accordance with claim 24, in which said folded sheet is shaped into a substantially trapezoidal form.

26. The structure in accordance with claim 24, in which the border fold is sub-divided relative to that of the chevron.

27. The structure in accordance with claim 24, having overlapping chevrons.

28. The structure in accordance with claim 24, in which the end plates comprise circular receiving grooved areas for the folded sheet borders, said grooved areas being integral with central sealing bases in said plates, thus unitary members being formed for various uses on filter members having different heights and diameters.

29. The structure in accordance with claim 1, in which the thickness of the borders is reduced relative to that of the remaining structure.

* * * * *